(12) United States Patent
Ogata

(10) Patent No.: US 9,499,342 B2
(45) Date of Patent: Nov. 22, 2016

(54) BELT DRIVING APPARATUS AND IMAGE FORMING APPARATUS

(71) Applicant: CANON KABUSHIKI KAISHA, Tokyo (JP)

(72) Inventor: Atsushi Ogata, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 135 days.

(21) Appl. No.: 13/997,405

(22) PCT Filed: Sep. 28, 2012

(86) PCT No.: PCT/JP2012/075866
§ 371 (c)(1),
(2) Date: Jun. 24, 2013

(87) PCT Pub. No.: WO2013/047901
PCT Pub. Date: Apr. 4, 2013

(65) Prior Publication Data
US 2014/0054139 A1 Feb. 27, 2014

(30) Foreign Application Priority Data

Sep. 30, 2011 (JP) .................................. 2011-216933

(51) Int. Cl.
*B65G 15/64* (2006.01)
*G03G 15/16* (2006.01)
(Continued)

(52) U.S. Cl.
CPC ........... *B65G 15/64* (2013.01); *G03G 15/1615* (2013.01); *G03G 15/755* (2013.01); *B65G 23/44* (2013.01); *G03G 2215/00151* (2013.01)

(58) Field of Classification Search
CPC ................................................... B65G 39/16
USPC ............. 198/806, 861.2, 807, 810.03, 844.1
See application file for complete search history.

(56) References Cited

U.S. PATENT DOCUMENTS 4,397,538 A   8/1983   Castelli et al.
5,308,725 A * 5/1994   Yu et al. .................. 430/56
(Continued)

FOREIGN PATENT DOCUMENTS

JP   58-100145 A   6/1983
JP   05-026314 A   2/1993
(Continued)

OTHER PUBLICATIONS

Notification of Transmittal of the International Search Report and the Written Opinion of the International Searching Authority dated Jan. 31, 2013; an International Search Report; and a Written Opinion of the International Searching Authority.

*Primary Examiner* — Gene Crawford
*Assistant Examiner* — Lester Rushin
(74) *Attorney, Agent, or Firm* — Fitzpatrick, Cella, Harper & Scinto

(57) ABSTRACT

A belt feeding unit includes a rotatable belt, a first stretching roller for stretching the belt, and a second stretching roller including a stretching portion for stretching the belt. A first member is provided at one end portion of the stretching portion with respect to a widthwise direction of the belt and perpendicular to a movement direction of the belt. The first member is movable relative to the stretching portion to change a position of one end of the stretching portion at the one end portion. In addition, a second member is provided at the other end portion of the stretching portion and is movable relative to the stretching portion to change a position of the other end of the stretching portion at the other end portion. When the belt shifts in the widthwise direction to contact the first member, the first member moves relative to the stretching portion to incline the stretching portion relative to the first stretching roller, and the second member does not prevent movement of the stretching portion by the first member.

11 Claims, 13 Drawing Sheets

(51) Int. Cl.
    *G03G 15/00*   (2006.01)
    *B65G 23/44*   (2006.01)

(56) References Cited

U.S. PATENT DOCUMENTS

| | | | |
|---|---|---|---|
| 6,078,766 A * | 6/2000 | Kurotaka | B65G 39/16 198/806 |
| 7,239,828 B2 | 7/2007 | Ito | |
| 7,267,255 B1 | 9/2007 | Young et al. | |
| 7,379,690 B2 | 5/2008 | Ito | |
| 7,389,068 B2 | 6/2008 | Ito | |
| 7,873,311 B2 | 1/2011 | Hara | |
| 7,957,685 B2 * | 6/2011 | Shimizu | 399/308 |
| RE42,572 E * | 7/2011 | Murase | 399/162 |
| 8,045,905 B2 | 10/2011 | Hara | |
| 2009/0202275 A1 | 8/2009 | Nishida et al. | |

FOREIGN PATENT DOCUMENTS

| | | |
|---|---|---|
| JP | 06-099055 A | 12/1994 |
| JP | 11-079459 A | 3/1999 |
| JP | 2005-092153 A | 4/2005 |
| JP | 2009-139952 A | 6/2009 |

* cited by examiner

BELT DRIVING APPARATUS AND IMAGE FORMING APPARATUS

TECHNICAL FIELD

The present invention relates to a belt driving unit which circularly moves an endless belt while suspending the belt with multiple belt suspending members. It relates also to an image forming apparatus such as an electrophotographic print, an electrophotographic copy machine, and the like, which is equipped with a belt driving unit in accordance with the present invention.

BACKGROUND ART

Some electrophotographic image forming apparatuses, for example, electrophotographic printers, electrophotographic copy machines, and the like are equipped with a belt driving unit which circularly moves an endless belt while suspending the belt with multiple belt suspending rollers. A belt driving unit such as the one described above is problematic in that as the belt is circularly driven, it tends to shift in the widthwise direction of the belt (direction roughly perpendicular to moving direction of belt).

There are various methods for controlling this lateral movement of the belt. One of them is disclosed in Japanese Laid-open Patent Application H05-26314. According to this patent application, the belt driving unit is provided with multiple belt suspending rollers, and one of the multiple belt suspending rollers is utilized as a belt position adjustment roller, that is, a roller for correcting the belt in terms of lateral shift. Further, the belt driving unit is provided with a belt position detection roller which is independently rotatable from the roller for correcting the belt in terms of lateral shift. The belt position detection roller is positioned next to one of the lengthwise ends of the belt suspending roller in order to correct the belt in terms of lateral shift. Further, the belt driving unit is provided with a string with a preset length. One end of the string is attached to the peripheral surface of the belt position detection roller. As the belt laterally shifts, it comes into contact with the belt position detection roller. Thus, the friction between the belt and belt position detection roller causes the belt position detection roller to rotate. Thus, the string is wound around the peripheral surface of the belt position detection roller, causing the rotational axis of the belt position adjustment roller to tilt in such a manner that the belt is made to shift toward the other end of the belt position adjustment roller.

However, the structural arrangement disclosed in Japanese Laid-open Patent Application H05-26314 makes it necessary for the other end (opposite end from belt position detection roller) of the belt position adjustment roller to be supported. Thus, the distance by which the belt position adjustment roller has to move to cancel the unwanted lateral shift of the belt is substantial. In other words, it is slow in response. Thus, it needs to be improved in responsiveness, and also, requires a large space in order to allow the belt position adjustment roller to sufficiently tilt for the belt to be put back into its proper position.

SUMMARY OF THE INVENTION

Thus, the primary object of the present invention is to provide a belt driving unit which is substantially smaller in the amount by which one of the belt suspension rollers is moved to keep the belt properly positioned in terms of the widthwise direction of the belt, than any belt unit driving unit in accordance with the prior art, and an image forming apparatus equipped with the belt driving unit in accordance with the present invention.

According to an aspect of the present invention, there is provided a belt feeding unit comprising a rotatable belt; a first stretching roller for stretching said belt; a second stretching roller including a stretching portion for stretching said belt, said stretching portion being rotated by rotation of said belt; a supporting portion for supporting said stretching portion while permitting movement of opposite end portions of said stretching portion with respect to a longitudinal direction perpendicular to a moving direction said belt; and a rotatable portion substantially coaxial with said second stretching roller and which is rotatable codirectionally with a moving direction of said belt relative to said stretching portion, wherein when said belt shifts in the longitudinal direction, said belt contacts said rotatable portion to rotate said rotatable portion, thus tilting said second stretching roller about said supporting portion relative to a rotational axis of said first stretching roller.

These and other objects, features, and advantages of the present invention will become more apparent upon consideration of the following description of the preferred embodiments of the present invention, taken in conjunction with the accompanying drawings.

DESCRIPTION OF EMBODIMENTS

Hereinafter, image forming apparatuses in accordance with the present invention will be described in detail with reference to the appended drawings.

Embodiment 1

Overall Structure of Image Forming Apparatus

Figure 1:
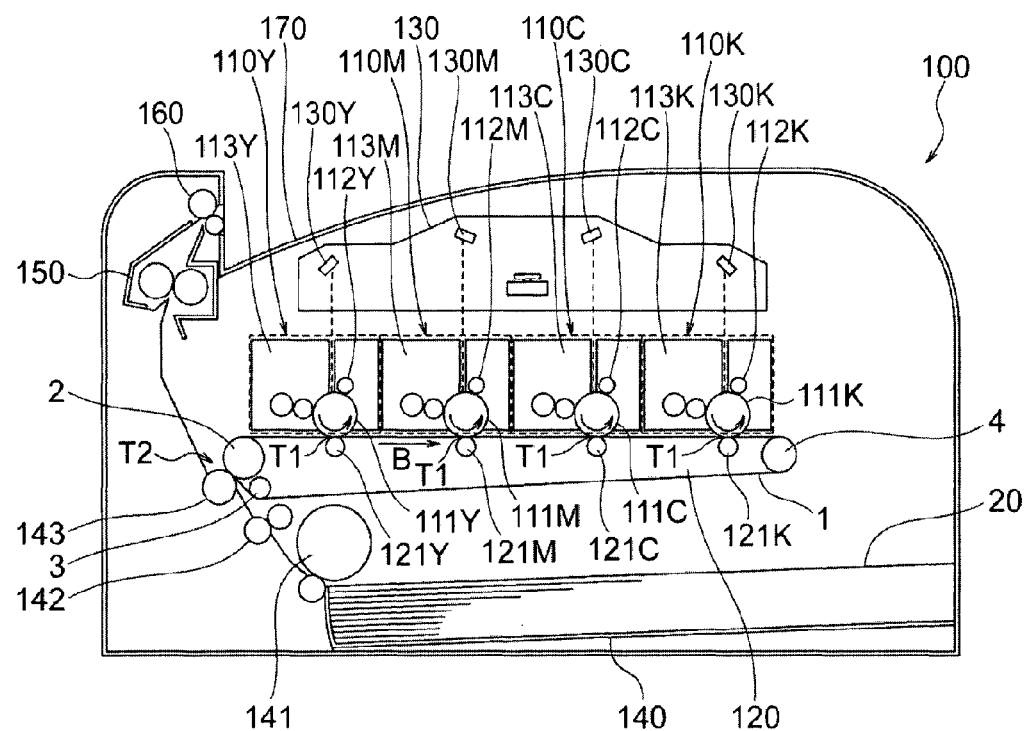
FIG. 1 is a schematic sectional view of a typical image forming apparatus equipped with a belt driving unit, as an intermediary transfer unit, in accordance with the present invention, and describes the general structure of the apparatus.

FIG. 1 is a schematic sectional view of a typical color image forming apparatus equipped with a belt driving unit, as an intermediary transfer unit, in accordance with the present invention, and shows the general structure of the apparatus. To begin with, the structure of the image forming apparatus 100 in this embodiment is described referring to FIG. 1. The image forming apparatus 100 can electrophotographically form an image on a sheet P of recording medium such as ordinary recording paper, OHP film, etc., in response to electrical signals sent from an external device such as a personal computer connected to the image forming apparatus 100 in such a manner that information can be exchanged between the image forming apparatus and external devices.

The image forming apparatus 100 has multiple (four in this embodiment) image formation units 110Y, 110M, 110C and 110K, which form yellow, magenta, cyan and black monochromatic toner images, respectively. The image formation units 11Y, 110M, 110C and 110K are roughly horizontally aligned. The image forming apparatus 100 has also an intermediary transfer unit 120, which comprises a belt driving unit. The intermediary transfer unit 120 is positioned so that it opposes each of the image formation units 110Y, 110M, 110C and 110K.

The intermediary transfer unit 120 has an intermediary transfer belt 1, which is a circularly movable endless belt. It is structured so that the intermediary transfer belt 1 can be circularly moved while being in contact with each of the image formation units 110Y, 110M, 110C and 110K.

In the case of the image forming apparatus 100 in this embodiment, as the belt 1 is circularly moved, monochromatic toner images formed in the image formation units 11Y, 110M, 110C and 110K, one for one, are sequentially transferred onto the intermediary transfer belt 1, and then, are transferred together from the intermediary transfer belt 1 onto a sheet 20 of recording medium to effect a full-color image on the sheet 20 of recording medium.

The image formation units 110Y, 110M, 110C and 110K are the same in structure and function, although they are different in the color of the toner image they form. Thus, unless they need to be individually described, they are going to be described as the same image formation units 110, that is, without suffixes Y, M, C and K which indicate the color of the monochromatic toner image they form. This rule applies also to the description of the image formation process of the image formation units 110Y, 110M, 110C and 110K.

The image formation unit 110 forms a monochromatic toner image with use of one of known electrostatic image formation processes. More specifically, the image forming apparatus 100 is provided with a photosensitive drum 111, that is, an electrophotographic photosensitive member, which is a cylindrical image bearing member on which an electrostatic latent image is formed. The photosensitive drum 111 is rotatable in the direction indicated by an arrow mark in FIG. 1. The image forming operation of the image forming apparatus 100 is as follows: First, the peripheral surface of the rotating photosensitive drum 111 is uniformly charged by a charge roller 112 which functions as a charging unit.

Next, the uniformly charged area of the peripheral surface of the photosensitive drum 111 is scanned by (exposed to) a beam of laser light emitted by a laser scanner, as an exposing unit, while being modulated by signals sent from a computer. Consequently, an electrostatic latent image is effected on the peripheral surface of the photosensitive drum 111. To the electrostatic latent image on the photosensitive drum 111 (image bearing member), toner is supplied as developer by a development unit 113, as a developing means, whereby the electrostatic latent image is developed into a visible image, that is, an image formed of toner (which hereafter will be referred to simply as "toner image").

The toner image formed on the photosensitive drum 111 through the above described processes is electrostatically transferred onto the belt 1 by the function of a primary transfer roller 121, which functions as a primary transfer member. The primary transfer roller 121 is positioned on the opposite side of the belt 1 of the intermediary transfer unit 120 from the photosensitive drum 111. More specifically, the intermediary transfer unit 120 is made up of the belt 1, the belt driving unit for circularly moving the belt 1, and primary transfer rollers 121. The primary transfer roller 121 is kept pressed against the peripheral surface of the photosensitive drum 111 with the presence of the belt 1 between the photosensitive drum 1 and primary transfer roller 121, forming thereby the primary transfer nip T1, between the belt 1 and photosensitive drum 111.

The monochromatic toner images formed on the photosensitive drums 111 of image formation units 110 in synchronism with the movement of the belt 1 through the above described image formation processes are sequentially transferred in layers onto the belt 1. Meanwhile, sheets 20 of recording medium in the recording medium storage 140 are pulled out one by one from the storage 140 by a pickup roller 141 or the like, and are sequentially sent to a pair of registration rollers 142. Then, each sheet 20 of recording medium is released by the registration rollers 142 with a preset timing so that the sheet 20 is conveyed to the secondary transfer nip T2, that is, the area of contact between the secondary transfer roller 143 and belt 1. In the secondary transfer nip T2, the toner images on the belt 1 are electrostatically transferred onto the sheet 20 of recording medium by the function of the secondary transfer roller 143.

Then, the sheet 20 of recording medium is separated from the belt 1, and is conveyed to the fixation unit 150. Then, the sheet 20 is conveyed through the fixation unit 150. While the sheet 20 is conveyed through the fixation unit 150, the sheet 20 and the toner images thereon are subjected to heat and pressure. Consequently, the toner images on the sheet 20 become solidly fixed to the sheet 20. Then, the sheet P is further conveyed, and discharged by a pair of discharge rollers 160 onto a delivery tray 170.

In the case of the image forming apparatus 100 in this embodiment, the photosensitive drum 111, charge roller 112, and development unit 113 of each image formation unit 110 are integrally placed in a shell (cartridge), forming a process cartridge, which is removably installable in the main assembly of the image forming apparatus 100. Further, the intermediary transfer unit 120 also is removably installable in the main assembly of the image forming apparatus 100.

(Intermediary Transfer Unit)

Figure 2:
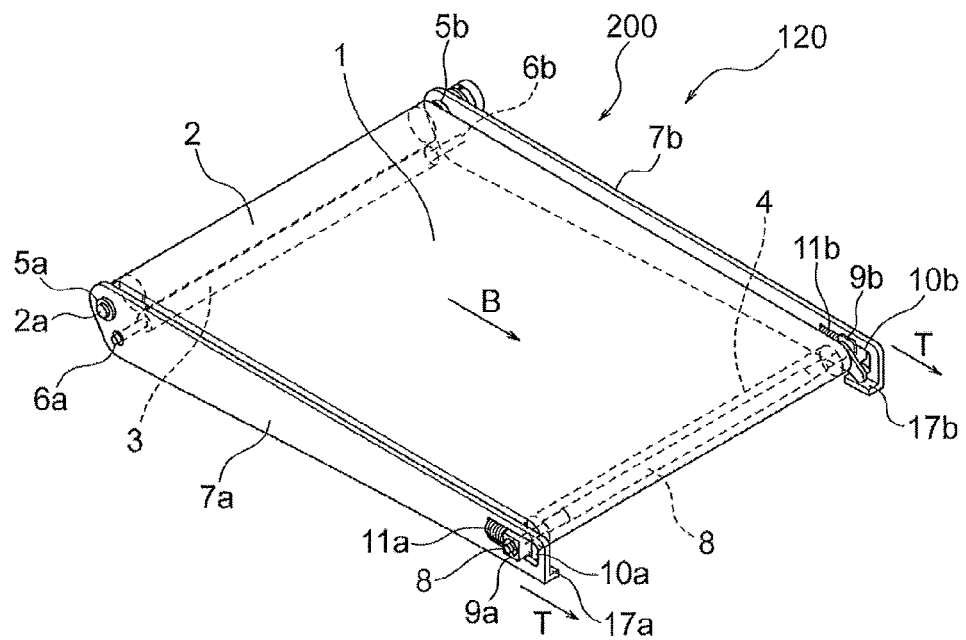
FIG. 2 is a perspective view of the belt driving unit in the first embodiment of the present invention, and shows the structure of the unit.

Next, referring to FIG. 2, the belt driving portion 200 of intermediary transfer unit 120, which is for circularly moving the belt 1 of the intermediary transfer unit 120, is described about its overall structure. FIG. 2 is a perspective view of the belt driving portion 200 of intermediary transfer unit 120 in this embodiment, and illustrates the external appearance of the portion 200.

The intermediary transfer unit 120 has the belt driving portion 200, the belt 1, and a belt driving roller 2. The belt driving roller 2 is one of the multiple belt suspending members (rollers) for suspending the belt while providing the belt with a preset amount of tension. It drives the belt 1. Further, the intermediary transfer unit 120 is provided with a slave roller 3 and a tension roller 4. The slave roller 4 is rotated by the circular movement of the belt 1. The tension roller 4 is for providing the belt 1 with a preset amount of tension. That is, the belt 1 is held by three rollers so that it can be circularly moved.

The belt driving roller 2 (which hereafter will be referred to simply as driving roller 2) and slave roller 3 are rotatably supported by a pair of bearings 5a and 5b and a pair of bearings 6a and 6b, respectively, by their lengthwise end portions. Here, the "widthwise direction" of the belt 1 means the direction roughly perpendicular to the direction of the belt movement.

The intermediary transfer unit 120 is provided with a pair of side plates 7a and 7b, which are solidly attached to the main assembly of the image forming apparatus 100. The aforementioned bearings 5a, 5b, 6a, and 6b, which support two rollers 2 and 4, are held by the side plates 7a and 7b, respectively. The driving roller 2 is rotated by the mechanical force transmitted thereto by an unshown mechanical power source such as a motor with which the image forming apparatus 100 is provided. As the driving roller 2 is rotated, it circularly moves the belt 1 in the direction indicated by an arrow mark B in FIG. 2. The slave roller 3 is rotated by the movement of the belt 1, which is caused by the driving roller 2. The slave roller 3 is supported roughly in parallel to the driving roller 2.

The tension roller 4 is supported in such a manner that it is movable in the direction indicated by an arrow mark T in FIG. 2. More specifically, the lengthwise end portions of the axle 8 of the tension roller 4 are fitted with a pair of bearings 9a and 9b, one for one, which are fitted in the long and narrow holes 10a and 10b with which the aforementioned side plates 7a and 7b, respectively, are allowed to slide in the moving direction of the belt 1. The bearings 9a and 9b are under the pressure generated by a pair of springs 11a and 11b as pressure applying elastic members. Thus, the belt 1 is provided with a preset amount of tension. As the belt 1 is driven by the driving roller 2, the tension roller 4 is rotated by the circular movement of the belt 1.

The belt driving portion 200 has a belt deviation control portion, which changes the angle between the axle 2a of the driving roller 2 and the axle 8 of the tension roller 4, in response to the positional deviation of the belt 1 in the direction roughly perpendicular to the moving direction of the belt 1.

In this embodiment, the driving roller 1 may be referred to simply as the first suspension roller, whereas the tension roller 4 which makes up a part of the belt shift control portion may be referred to simply as the second suspension roller.

Figure 3:
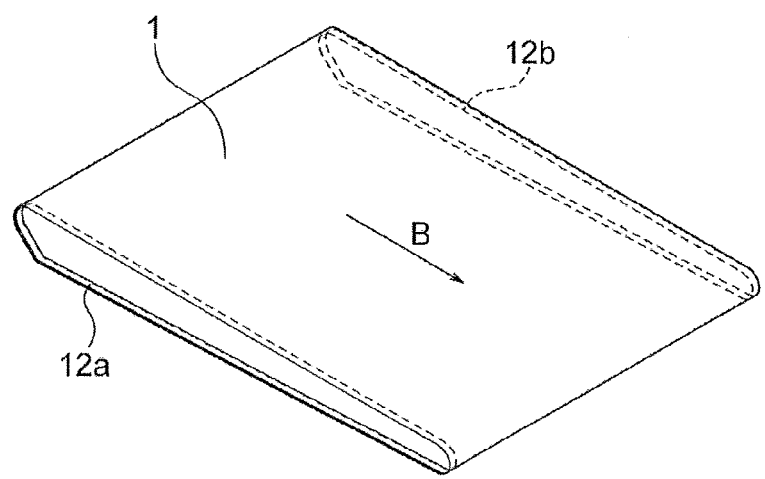
FIG. 3 is a perspective view of the belt in accordance with the present invention, and shows the structure of the belt.
Figure 4:
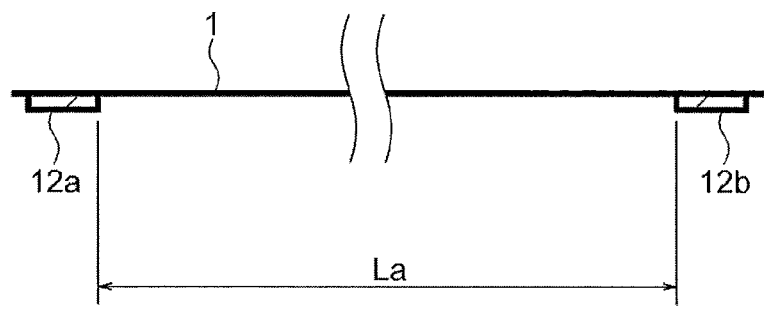
FIG. 4 is a schematic sectional view of the belt in accordance with the present invention, at a plane which is perpendicular to the belt movement direction and parallel to the widthwise direction of the belt, and shows the structure of the belt.

FIG. 3 is a perspective view of the belt 1, and shows the structure of the belt 1. FIG. 4 is a schematic sectional view of the belt 1 at a plane which is perpendicular to the belt movement direction and parallel to the widthwise direction of the belt. Referring to FIGS. 3 and 4, the belt 1 is provided with a pair of ribs 12a and 12b, which are attached to the inward surface of the belt 1, being positioned slightly inward of the corresponding lateral edges of the belt 1, one for one, and also, being positioned so that the distance between the ribs 12a and 12b in terms of the widthwise direction of the belt is La. The ribs 12a and 12b project roughly perpendicular to the inward surface of the belt 1. They extend across the entire inward circumference of the belt 1.

Next, referring to FIGS. 5-9, the structure of the tension roller 4 is described.

Figure 5:
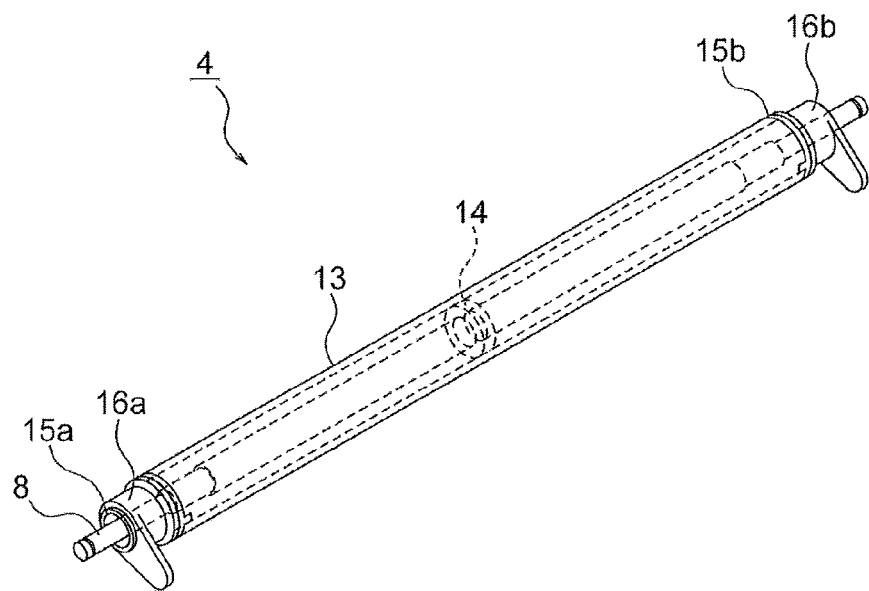
FIG. 5 is a perspective view of the belt suspending second member of the belt driving unit in the first embodiment, and shows the structure of the member.
Figure 6:
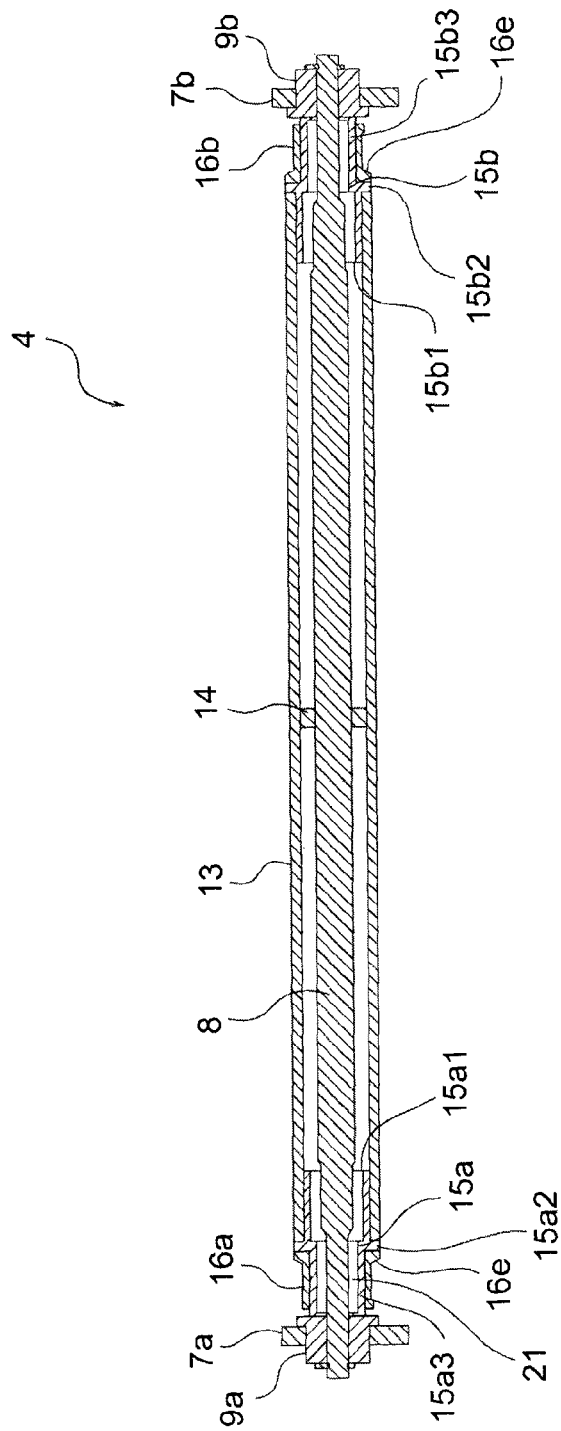
FIG. 6 is a schematic sectional view of the belt suspending second member of the belt driving unit in the first embodiment, at a vertical plane which coincides with the axial line of the belt suspending second member, and shows the structure of the member.

FIG. 5 is a perspective view of the tension roller 4, and FIG. 6 is a schematic sectional view of the tension roller 4, at a vertical plane which coincides with the axial line of the tension roller 4. Referring to FIGS. 5 and 6, the tension roller 4 is made up of a cylindrical hollow sleeve 13, and the axle 8, as a referential member, put through the sleeve 13. The belt driving unit is structured so that the belt 1 wraps around the peripheral surface of the sleeve 13. The sleeve 13 is the portion of the tension roller 4, that suspends and keeps tensioned the belt 1.

The roughly center portion of the axle 8 in terms of the widthwise direction of the belt 1 is fitted with a bearing 14, which supports the axle 8 in such a manner that the sleeve 13 is allowed to tilt relative to the axle 8. That is, the axle 8 applies to the sleeve 13, the pressure applied to the axle 8 by a pair springs 11a and 11b, by holding the sleeve 13 by the roughly center portion of the sleeve 13 in such a manner that the sleeve 13 is allowed to rotationally move about the bearing 14. In other words, the sleeve 13 is supported by the bearing 14, only at its roughly center portion.

Further, the belt driving portion 200 is structured so that the external diameter of the bearing 14 is smaller than the internal diameter of the sleeve 13, and also, so that the external diameter peripheral surface of the axle 8 smaller than the internal diameter of a pair of flanges 15a and 15b. That is a gap 21 is provided between the axle 3 and each of the flanges 15a and 15b. The presence of this gap 21 enables the sleeve 13 to rotationally move about the bearing 14. In other words, the rotational axis of the sleeve of the tension roller 4 can be tilted relative to the axle 8. Incidentally, instead of the bearing 14 in this embodiment, one of the known automatic centering bearings is structured so that its outward surface is allowed to tilt relative to its inward surface may be used.

Next referring to FIG. 6, the lengthwise ends of the sleeve 13 are fitted with flanges 15a and 15b in such a manner that the sleeve 13 and each of the flanges 15a and 15b are not movable relative to each other. The flanges 15a and 15b have cylindrical portions 15a1 and 15a2, respectively, which are inserted into the hollow of the sleeve 13 in order to keep the flanges 15a and 15b solidly attached to the sleeve 13. The flanges 15a and 15b have also collar portions 15a2 and 15b2, which come into contact with the lengthwise ends of the sleeve 13, one for one, as the flanges 15a and 15b are inserted into the sleeve 13. Further, the flanges 15a and 15b have bosses 15a3 and 15b3, which rotatably support a pair of rollers 16a and 16b, which rotate around the bosses 15a3 and 15b3, respectively.

The flanges 15a and 15b rotate with the sleeve 13. The internal diameter of each of the flanges 15a and 15b is greater than the external diameter of the axle 8. Thus, the sleeve 13 is allowed to rotationally move about the bearing 14. Further, the flanges 15a and 15b regulate the movement of the sleeve 13 in the direction of the rotational axis of the sleeve 13, by coming into contact, by their outward edges, with the bearings 9a and 9b fitted in the long and narrow holes of the side plates 7a and 7b solidly attached to the frame of the main assembly of the image forming apparatus 100.

The rollers 16a and 16b are cylindrical and hollow. They are rotatably fitted around the bosses 15a3 and 15b3 of the flanges 15a and 15b, respectively. More specifically, the rollers 16a and 16b are fitted around the bosses 15a3 and 15b3 of the flanges 15a and 15b in such a manner that their rotational axis coincides with those of flanges 15a and 15b, which coincide with the rotational axis of the tension roller 4, or the second suspension roller. They are at the lengthwise ends of the tension roller 4, and are allowed to rotate independently from the sleeve 13 and flanges 15a and 15b, respectively, while remaining coaxial with the sleeve 13 and flanges 15a and 15b.

Figure 7:
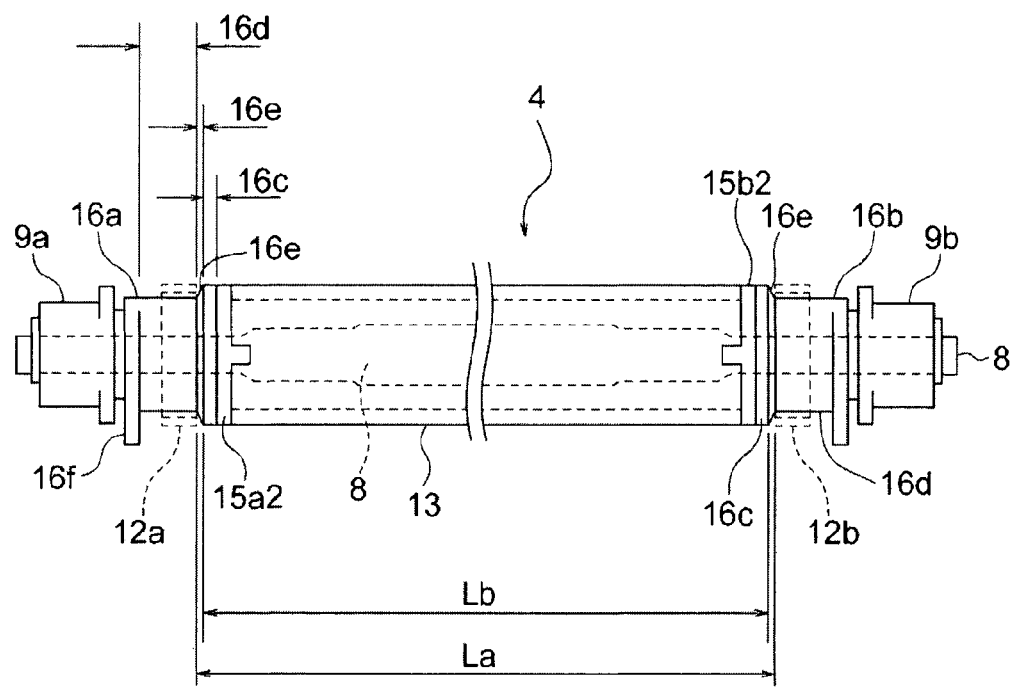
FIG. 7 is a side view of the lengthwise end portions of the belt suspending second member of the belt driving unit in the first embodiment, and shows the structure of the lengthwise end portions.
Figure 8:
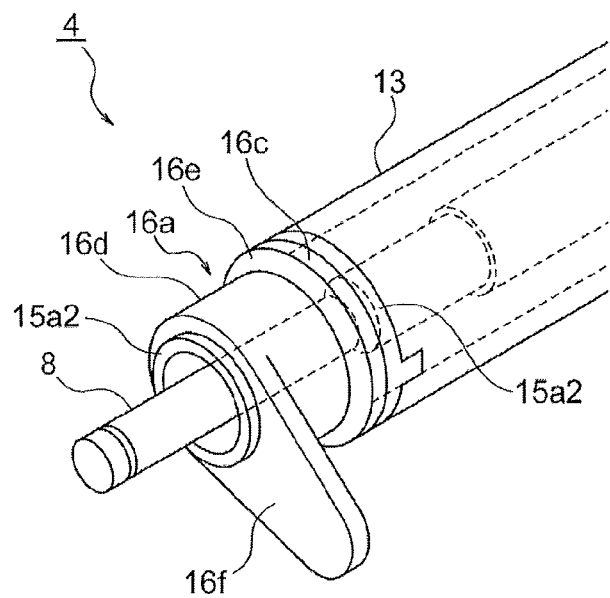
FIG. 8 is an enlarged perspective view of one of the lengthwise end portions of the belt suspending second member in the first embodiment, and shows the structure of the member.

FIG. 7 is an enlarged side view of the lengthwise end portions of the tension roller 4. FIG. 8 is a perspective view of one of the lengthwise end portions of the tension roller 4. Referring to FIGS. 7 and 8, the rollers 16a and 16b, which are fitted around the bosses 15a3 and 15b3 of the flanges 15a and 15b, respectively, have a belt contacting portion 16c, which is roughly the same in external diameter as the sleeve 13. Further, the rollers 16a and 16b have a rib separating portion 16d, the external diameter of which is large enough to create a step between itself and the ribs 12a and 12b. Further, the rollers 16a and 16b have a rib contacting portion 16e, which is the slant surface which connects the belt contacting portion 16c with the rib separating portion 16d. Incidentally, the rollers 16a and 16b may be structured so that the rib contacting portion 16e is perpendicular to the axial lines of the rollers 16a and 16b.

Referring to FIG. 7, the belt 1 and ribs 12a and 12b do not come into contact with the rib separating portion 16d of the roller 16a, nor the rib separating portion of the roller 16b. As the belt 1 shifts in the left or right direction in FIG. 7, either the inward side of the rib 12a comes into contact with the rib contacting portion 16e of the roller 16a, or the inward side of the rib 12b comes into contact with the rib contacting portion 16e of the roller 16b. In this embodiment, the angle of the rib contacting portion 16e relative to the axial line of the roller 16a and 16b is 80 degrees.

Referring again to FIG. 7, the distance La between the ribs 12a and 12b, which are on the widthwise end portions of the belt 1, one for one, is set to be greater than a distance Lb between the point of contact between the rib contacting portion 16e of the roller 16a, and the point of contact between the rib contacting portion 16e of the roller 16b. The rollers 16a and 16b are positioned at the lengthwise ends of the tension roller 4, one for one. Therefore, as the belt 1 shifts in its widthwise direction, either the rib 12a comes into contact with the rib contacting portion 16e of the roller 16a, or the rib 12b comes into contact with the rib contacting portion 16e of the roller 16b.

Each of the rollers 16a and 16b has a cam portion 16f, which is on the outward side of the rib separating portion 16d, and also, on the outward side of the edge of the belt 1, in terms of the widthwise direction of the belt 1.

Figure 9:
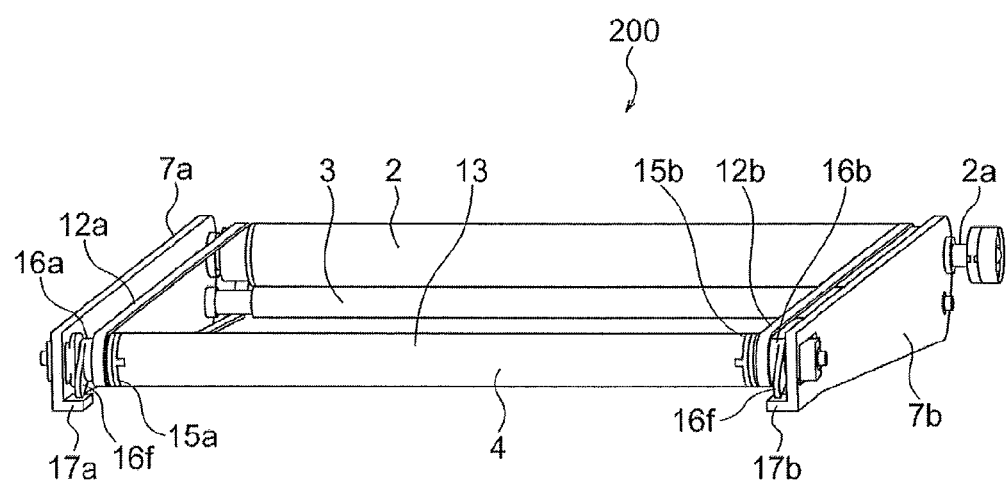
FIG. 9 is a perspective view of the belt driving unit in the first embodiment of the present invention, and shows the structure of the unit.

FIG. 9 is a perspective view of the belt driving portion 200, that is, the intermediary transfer unit 120 minus the belt 1. The side plates 7a and 7b solidly attached to the frame of the image forming apparatus 100 are provided with stopper portions 17a and 17b, respectively, which are positioned so that after the assembly of the belt driving portion 200, the stopper portions 17a and 17b are a preset distance away from the rotational axis of the tension roller 4. On the other hand, each of the rollers 16a and 16b is provided with the aforementioned cam portion 16f, which comes into contact with the stopper portion 17a or 17b, respectively.

As the belt 1 shifts in its widthwise direction relative to the tension roller 4 (second suspension roller), either the rib 12a which is on the inward surface of the belt 1 and on the slightly inward side of the corresponding edge of the belt 1, comes into contact with the rib contact portion 16e of the roller 16a, or the rib 12b which is on the inward surface of the belt 1 and on the slightly inward side of the corresponding edge of the belt 1 comes into contact with the rib contact portion 16e of the roller 16b. Thus, one of the rollers 16a and 16b is rotated by the rotational force transmitted thereto by the friction between the roller 16 and rib 12, causing the cam portion 16f of the roller 16 to come into contact with the stopper portion 17 (17a or 17b). Consequently, the roller 16a or 16b is prevented from rotating further.

Figure 12:
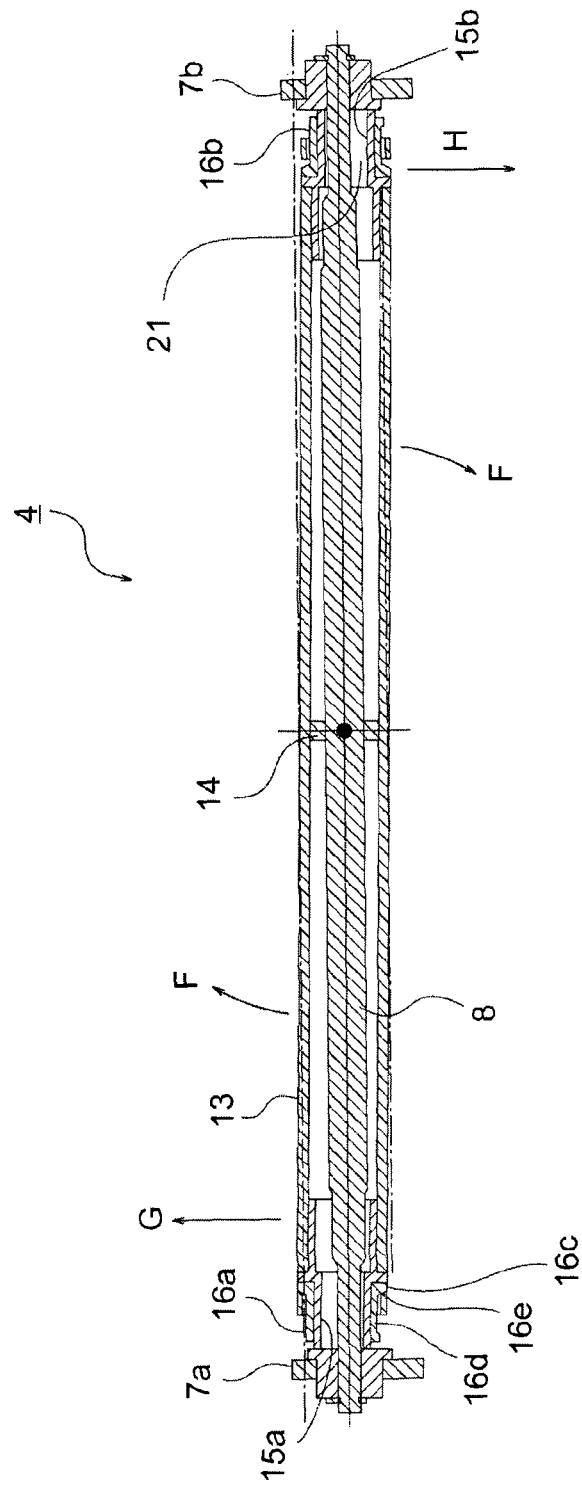
FIG. 12 is a schematic sectional view of the belt supporting second member in the first embodiment, at a vertical plane which coincides with the axial line of the member, and is for describing the movement of the belt position adjustment automatic mechanism.

Next, referring to FIG. 12, even after the cam portion 16f of the roller 16 came into contact with the stopper portion 17, the rotational force continues to be transmitted to the roller 16. Thus, the gap 21 (clearance) between the peripheral surface of the axle 8 and the inward surface of the flange 15 (15a or 15b) allows the flanges 15 (15a or 15b), the rotational axis of which coincides with that of the roller 16 (16a or 16b), to displace upward. Consequently, the sleeve 13 of the tension roller 4 is tilted in such a manner that one of its lengthwise ends moves upward, causing the rotational axis of the sleeve 13 of the tension roller 4 to tilt relative to the axle 8. That is, the rotational axis of the sleeve 13 of the tension roller 4 becomes tilted relative to the rotational axis 2a of the driving roller 2.

Even after the tilting of the sleeve 13, the rollers 16a and 16b are allowed to freely rotate relative to the flanges 15a and 15b and sleeve 13. Therefore, the flanges 15a and 15b, by which the rollers 16a and 16b are held, and the sleeve 13, are allowed to continue to be rotated by the movement of the belt 1.

Figure 10:
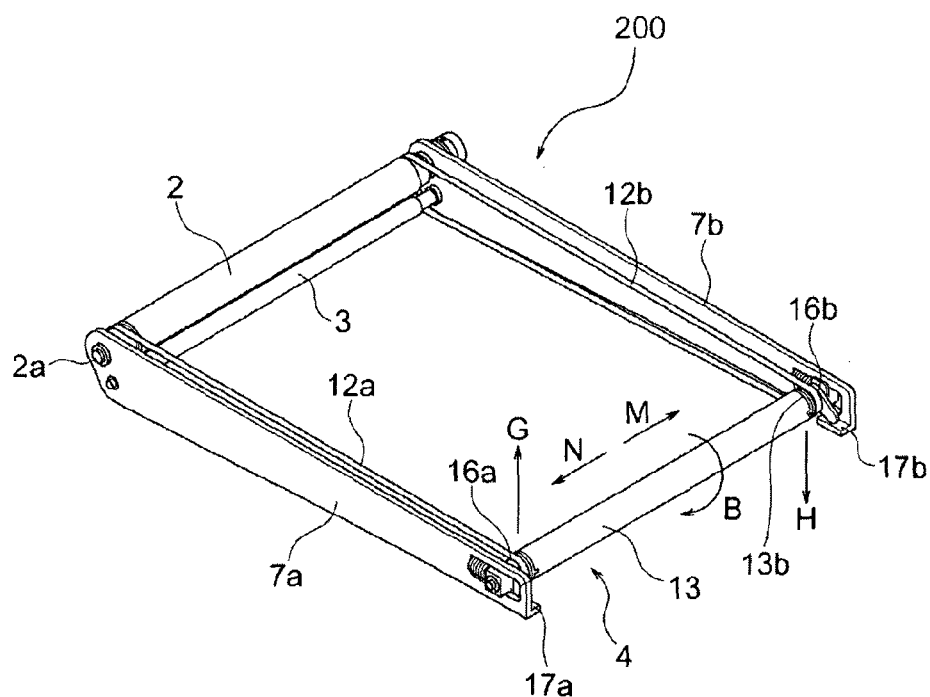
FIG. 10 also is a perspective view of the belt driving unit in the first embodiment of the present invention, and shows the structure of the unit.
Figure 11:
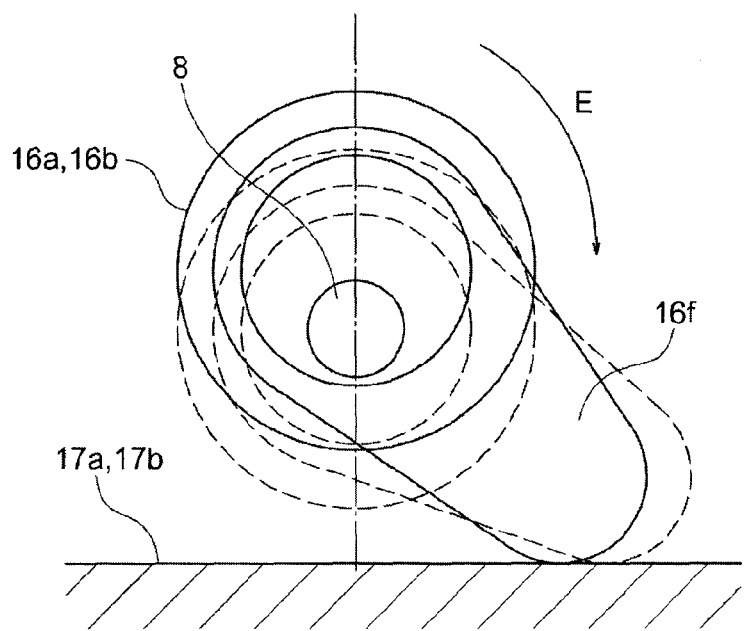
FIG. 11 is a plan view of one of the lengthwise end portions of the belt supporting second member in the first embodiment, as seen from the lengthwise direction of the member, and is for describing the movement of the belt position adjustment automatic mechanism in the first embodiment.

Next, referring to FIGS. 10-12, the mechanism for correcting the belt in position in terms of the widthwise direction of the belt 1, by utilizing the tilting of the sleeve 13 of the tension roller 4 is described about its operation. Hereafter, this mechanism may be referred to simply as "belt centering mechanism".

FIG. 10 is a drawing of the belt driving portion 200, that is, the intermediary transfer unit 120 minus the belt 1. As the belt 1 circularly moves in the direction indicated by the arrow mark B in FIG. 10 by being driven by the driving roller 2, the belt 1 shifts in the direction indicated by an arrow mark M or N in FIG. 10, because of the above-described structure of the belt driving portion 200. Thus, the rib 12a or 12b, with which the belt 1 is provided, comes into contact with the rib contacting portion 16e of the rollers 16a or 16b, respectively, giving rotational force to the rollers 16a or 16b, respectively.

In terms of the widthwise direction of the belt 1, the ribs 12a and 12b are on the outward side of the rib contacting portion 16e of the rollers 16a and 16b, respectively. Thus, as the belt 1 shifts rightward (direction indicated by arrow mark M) in FIG. 10, the roller 16a, or the left roller 16 in FIG. 10, is given the rotational force, whereas as the belt 1 shifts leftward (direction indicated by arrow mark N) in FIG. 10, the roller 16b, or the right roller 16b in FIG. 10, is given the rotational force.

That is, in this embodiment, in a case where the belt 1 shifts in the direction of the rib 12b (second protrusion), the roller 16a as the first rotational member receives rotational force from the belt 1 through the rib 12a, which is on the inward side of the rib 12. In a case where the belt 1 shifts toward the rib 12a (first protrusion), the roller 16b as the second rotational member rotates by receiving the rotational force from the belt 1 through the rib 12b.

FIG. 11 is a drawing for describing what occurs as the cam portions 16f of the roller 16a or 16b comes into contact with the stopper 17a or 17b, respectively. Referring to FIG. 11, as the contact occurs, the roller 16 (16a or 16b) comes under the rotational force which it receives from the rib 12 (12a or 12b), and which acts in the direction to rotate the roller 16 (16a or 16b) in the direction indicated by an arrow mark E in FIG. 11. However, the roller 16a is prevented by the contact between the cam portion 16 and stopper 17 (17a or 17b), from rotationally moving. Thus, the reaction force resulting from the rotational force, which the roller 16 receives from the belt 1 through the rib 12 (12a or 12b), causes the roller 16 (16a or 16b) to move upward from the position indicated by a broken line in FIG. 11 to the position indicated by a solid line. Consequently, the flange 15 (15a or 15b), around the boss 15 (15a or 15b) of which the roller 16 (16a or 16b) is fitted, and which is coaxial with the roller 16 (16a or 16b) is pushed upward. Thus, the sleeve 13, in the lengthwise end portion of which the cylindrical portion of the flange 15 (15a or 15b) is fitted, is tilted in such a direction that the corresponding lengthwise end of the sleeve 13 is positioned higher than the opposite end of the sleeve 13.

FIG. 12 is a schematic sectional view of the tension roller 4, at a vertical plane which coincides with the axial line of the tension roller 4, under the condition in which the sleeve 13 of the tension roller 4 has become tilted relative to the axle 8. If the roller 16a, or the left roller 16 in FIG. 12, is made to react as shown in FIG. 11, the sleeve 13 rotationally moves about the bearing 14 in the direction indicated by an arrow mark F in FIG. 12, from the position indicated by the broken line in FIG. 12, and in which it is horizontal, to the position indicated by the solid line in FIG. 12.

First, a case in which the belt 1 shifts in the direction indicated by the arrow mark M in FIG. 10 is described. In this case, the left rib 12a in FIG. 10 comes into contact with the rib contacting portion 16e of the roller 16a. Thus, the roller 16a is given rotational force by the friction between the rib 12a and the rib contacting portion 16e of the roller 16, being thereby rotated until its cam portion 16f comes into contact with the stopper portion 7a. The contact between the cam portion 16f of the roller 16a and the stopper portion 7a prevents the roller 16a from rotating further. Thus, the flange 15a is moved (upward) in the direction indicated by an arrow mark G in FIG. 12. Consequently, the sleeve 13 is rotationally moved about the bearing 14 in such a direction that its lengthwise end, in which the flange 15a is fitted, moves upward.

As the lengthwise end of the sleeve 13, in which the flange 15a is fitted, moves upward, the opposite (right) end of the sleeve 13 moves in the direction (downward) indicated by an arrow mark H in FIG. 12. However, the rib contacting portion 16e of the roller 16b has been moved by the shifting of the belt 1, into a position in which it cannot contact the rib 12b. Therefore, the roller 16b is not subjected to the rotational force from the belt 1. Therefore, it does not interfere with the tilting of the sleeve 13 in the direction indicated by the arrow mark H in FIG. 12.

As described above, as the sleeve 13 of the tension roller 4 tilts relative to the driving roller 2 and slave roller 3, the force which has been affecting the belt 1 in such a manner that the belt 1 is shifted in the direction indicated by the arrow mark M reduces, being overcome by the force which affects the belt 1 in such a manner that the belt 1 is shifted in the direction indicated by the arrow mark N. Thus, the belt 1 begins to shift in the direction indicated by the arrow N, causing the rib 12a to separate from the rib contacting portion 16e of the roller 16a.

That is, if the belt 1 shifts in the direction indicated by the arrow mark M in FIG. 10, the sleeve 13 is tilted in the direction to cancel the force which causes the belt 1 to shift, and is kept tilted until the rib 12a disengages from the rib contacting portion 16e of the roller 16a.

Similarly, as the belt 1 shifts in the direction indicated by the arrow mark N (opposite direction from direction indicated by arrow mark M) in FIG. 10, the rib contacting portion 16e of the roller 16b (opposite roller from roller 16a) comes into contact with the side wall of the rib 12b. Consequently, the sleeve 13 is tilted in the opposite direction from the direction in which it is tilted as the belt 1 shifts in the direction indicated by the arrow mark M. Thus, the belt 1 is shifted back in the direction indicated by the arrow mark M.

As described above, as the belt 1 deviates in position in its widthwise direction, either the rib 12a or 12b attached to the belt 1 comes into contact with the roller 16a or 16b, respectively, giving rotational force to the roller 16a or 16b, respectively, whereby the sleeve 13 is directly tilted by the roller 16a or 16b. That is, the force which affects the belt 1 in such a manner that the belt shifts in position in its widthwise direction is directly converted into such force that works in the direction to tilt the sleeve 13 of the tension roller 4. As a result, it is possible to tilt the sleeve 13 of the tension roller 4 relative to the driving roller 2 and slave roller 3.

In this embodiment, the belt driving portion 200 has three rollers, that is, the driving roller 2, slave roller 3, and tension roller 4, by which the belt 1 is suspended so that the belt 1 can be circularly moved. However, the present invention is applicable to a belt driving mechanism having only the driving roller 2 and tension roller 4. Further, the present invention is also applicable to a belt driving mechanism having four or more rollers, as long as at least one of the roller is provided with a roller tilting mechanism such as the one with which the tension roller 4 in this embodiment is provided.

As described above, according to this embodiment, the present invention makes it unnecessary that the rollers for rotatably suspending the belt 1 are extremely precise in dimension and parallelism, and also, that the belt 1 and ribs 12a and 12b are extremely precise in dimension. Further, the present invention can provide a belt driving mechanism which is simple in structure, and yet can automatically prevent in realtime the problem that the belt 1 is made to laterally deviate in position by the distortion of the belt driving mechanism which occurs during its setup, and/or its wear resulting from usage.

Embodiment 2

Next, referring to FIGS. 13 and 14, the invention is described with reference to another belt driving unit in accordance with the present invention, and an image forming apparatus equipped with this belt driving unit. In the following description of the second embodiment, the components, portions, etc., of the belt driving unit and image forming apparatus, which are the same in structure as the counterparts in the first embodiment are given the same referential codes as those given to the counterparts, and are not going to be described here. In the first embodiment, both the widthwise edge portions of the belt 1 were provided with ribs 12a and 12b, one for one. Further, both the lengthwise end portions of the tension roller 4 were provided with rollers 16a and 16b, one for one, having the rib contacting portion 16e, which corresponds to the ribs 12a or 12b, respectively.

In this embodiment, the belt driving unit is structured so that the belt 1 is made to tend to laterally shift in only one direction in terms of its widthwise direction. Further, the belt 1 is provided with only one rib 12 (12a), which is attached to the adjacencies of one of the edges of the belt 1. Moreover, only the end of the tension roller 4, which corresponds in position to the belt edge having the rib 12 (12a) is provided with the roller 16 (16a) having the rib contacting portion 16e. Further, the belt driving unit is structured so that as the belt 1 shifts in the preset direction, the roller 16a is rotated by the rotational force it receives from the belt 1 through the rib 12a.

Figure 13:
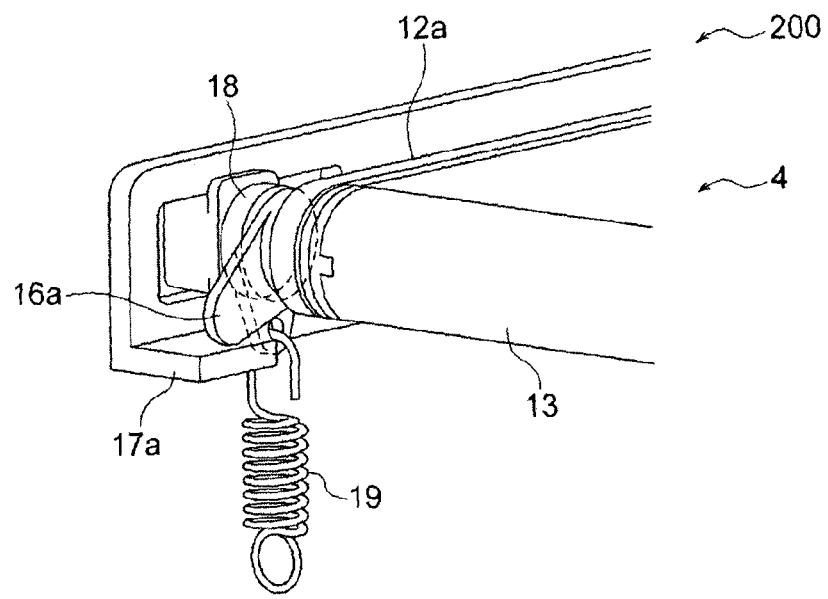
FIG. 13 is an enlarged perspective view of one of the lengthwise end portions of the belt suspending second member in the second embodiment, and shows the structure of the member.

FIG. 13 is an enlarged perspective view of one of the lengthwise end portions of the tension roller 4 of the belt driving portion 200 in this second embodiment. It does not show the belt 1. Referring to FIG. 13, the belt driving portion 200 in this embodiment is provided with a bearing 18, which is independent from the roller 16a. The bearing 18 is rotatably fitted around the end portion of the boss 15a3 of the flange 15a, and is kept under the downward force (in FIG. 13) generated by a spring 19 engaged with a part of the bearing 18. Thus, the sleeve 13 is always under such pressure that works in the direction to tilt the sleeve 13 in one direction. In other words, the belt driving portion 200 in this embodiment is structured so that the belt 1 tends to laterally shift in only one direction (leftward in FIG. 14).

Figure 14:
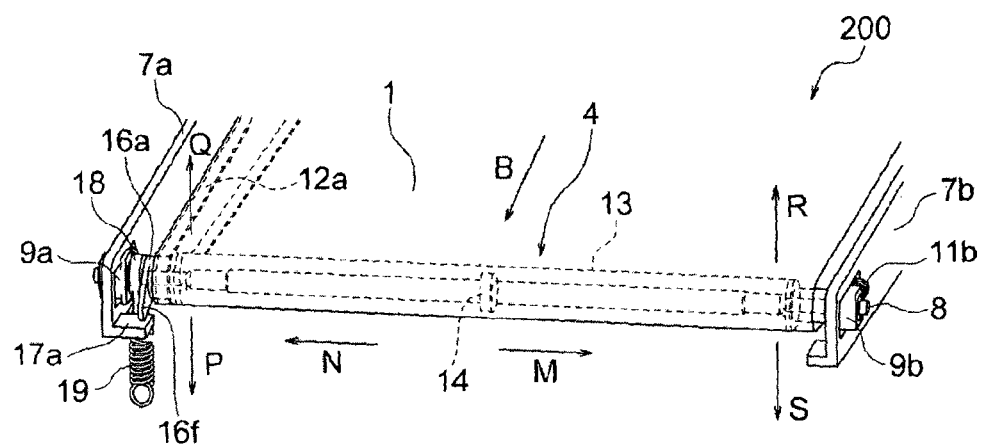
FIG. 14 is a perspective view of the belt suspending second member, and its adjacencies, in the second embodiment of the present invention, and shows the structure of the belt driving unit.

This embodiment is described with reference to a case in which the flange 15a, that is, the flange 15, with which the left end portion of the tension roller 4 in FIG. 14 is provided, is provided with the above-described pressure applying mechanism. The pressure generated by the spring 19 keeps the sleeve 13 tilted so that the left side of the sleeve 13 is positioned lower (indicated by arrow mark P) than the right side of the sleeve 13, that is, the right side of the sleeve 13 is positioned higher (indicated by arrow mark Q) than the left side of the sleeve 13. Thus, as the belt 1 is circularly moved in the direction indicated by an arrow mark B in FIG. 14 by the belt driving portion 200 in this embodiment, it tends to shift in the direction indicated by an arrow mark M in FIG. 14.

As the belt 1 shifts in the direction indicated by the arrow mark M, the rib 12a comes into contact with the rib contacting portion 16e of the roller 16a, giving thereby the roller 16a the rotational force from the belt 1. Thus, the cam portion 16f of the roller 16a comes into contact with the stopper portion 17a, and prevents the roller 16a from rotating further. Thus, such force that works in the direction to push the left end portion of the sleeve 13 upward (indicated by arrow mark Q in FIG. 14) is generated.

As long as the belt driving portion 200 is designed so that the force generated by the spring 19 is substantially smaller than the force generated in the direction to push the left end portion of the sleeve 13 upward, by the interaction between the roller 16a and the lateral shift of the belt 1, the sleeve 13 is tilted (direction indicated by arrow mark Q) against the force generated by the spring 19 in the direction to position the left side of the sleeve 13 higher than the right side of the sleeve 13; sleeve 13 is tilted in the direction (indicated by arrow mark S) to position the right side of the sleeve 13 lower than the left side. Thus, the belt 1 begins to shifts in the direction indicated by an arrow mark N in FIG. 14, that is, the opposite direction from the direction in which it was shifting.

As the belt 1 shifts in the direction indicated by the arrow mark N, the rib 12a separates from the rib contacting portion 16e of the roller 16a, stopping thereby transferring the rotational force to the roller 16a. Consequently, the force which was working in the direction to push the left end portion of the sleeve 13 upward in FIG. 14 vanishes. Thus, the sleeve 13 is tilted by the force generated by the spring 19, in the direction (indicated by arrow mark P) to position the left side of the sleeve 13 lower than the right side of the sleeve 13, causing the belt 1 to begin to shift again in the direction indicated by the arrow mark M in FIG. 14.

As described above, if the belt 1 shifts in the direction indicated by the arrow mark M in FIG. 14, the sleeve 13 is adjusted in angle by the function of the roller 16a so that the belt 1 shifts in the direction indicated by the arrow mark N in FIG. 14, whereas if the belt 1 shifts in the direction indicated by the arrow mark N in FIG. 14, the sleeve 13 is adjusted in angle by the function of the spring 19 so that the belt 1 shifts in the direction indicated by the arrow mark M in FIG. 14. These adjustments are alternately repeated to prevent the belt 1 from continuing to shift in only one direction. In this embodiment, therefore, the lengthwise right end of the tension roller 4 does not need to be provided with the rib 12 (12b) and roller 16 (16b), with which the lengthwise right end of the tension roller 4 was provided in the first embodiment. In other words, the lateral deviation of the belt 1 can be simply prevented by providing only one of the lengthwise ends of the tension roller 4 with the belt centering mechanism in this embodiment. That is, the belt driving portion 200 in this embodiment is simpler in structure and lower in cost, than the one in the first embodiment.

In this embodiment, the belt driving portion 200 was structured to keep the sleeve 13 pressured in a preset direction by the spring 19. However, the belt driving portion 200 may be provided with a mechanism which makes the sleeve 13 tend to tilt in one direction with the use of a means other than the spring 19, while being otherwise structured the same as the belt driving portion 200 in the first embodiment. The effects of such modification are the same as those of the first and second embodiments.

Embodiment 3

Next, referring to FIG. 15, the third embodiment of the present invention is described with reference to another belt driving unit in accordance with the present invention, and an image forming apparatus equipped with the belt driving unit. The components, portions, etc., of the belt driving unit and image forming apparatus, which are similar in structure as the counterparts in the first embodiment are given the same referential codes as those given to the counterparts, and are not going to be described here. In the first embodiment, the belt 1 was provided with the ribs 12a and 12b, which were attached next to the edges of the belt 1, one for one, and the lengthwise ends of tension roller 4 were provided with the rollers 16a and 16b, one for one, having the rib contacting portion 16e which corresponds in position to the rib 12a or 12b, respectively.

Further, the belt driving portion 200 was structured so that as the belt 1 shifts in its widthwise direction, only the rib 12 (12a or 12b) which is on the side toward which the belt is shifting comes into contact with the corresponding roller 16 (16a or 16b). In comparison, in this embodiment, the belt driving portion 200 is structured so that both the ribs 12a and 12b remain in contact with the rib contacting portion 16e of the roller 16a, and the rib contacting portion 16e of the roller 16b, respectively, regardless of the direction of the lateral shift of the belt 1.

Figure 15:
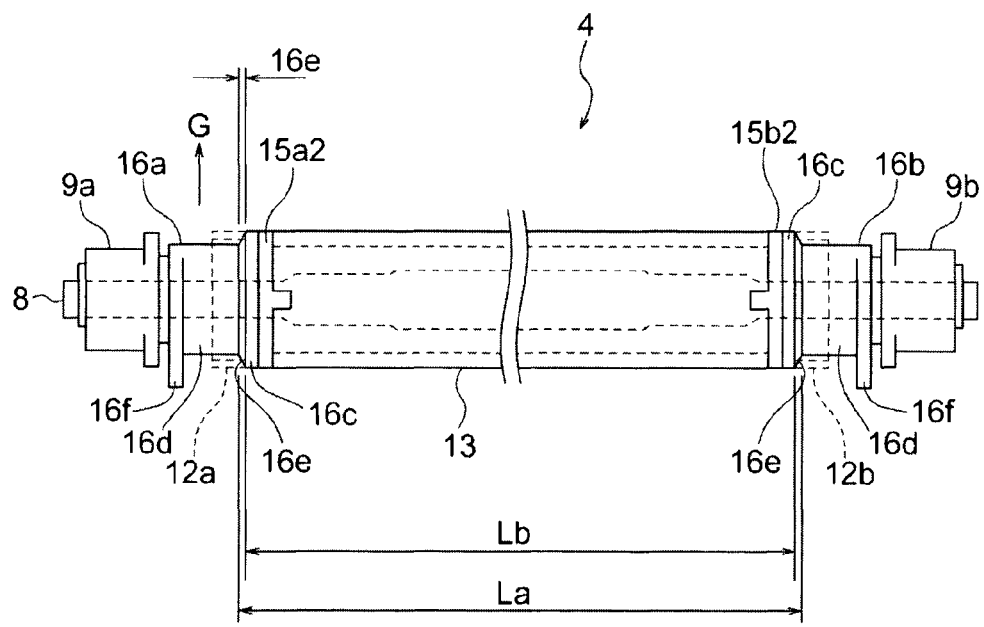
FIG. 15 is a side view of the lengthwise end portions of the belt suspending second member of the belt driving unit in the third embodiment, and shows the structure of the lengthwise end portions.

FIG. 15 is an enlarged side view of the lengthwise end portions of the tension roller 4 in this embodiment. Referring to FIG. 15, a referential code La stands for the distance between the ribs 12a and 12b which are on the inward surface of the belt 1, and which are in the adjacencies of the edges of the belt 1, one for one, and a referential code Lb stands for the distance between the rollers 16a and 16b, which are at the lengthwise ends of the tension roller 4. The belt driving portion 200 is structured so that the distances La and Lb satisfy an inequality (Lb>La), although it may be structured so that Lb=La.

With the belt driving portion 200 being structured as described above, both the rib contacting portion 16e of the roller 16a, and the rib contacting portion 16e of the roller 16b, always remain in contact with the ribs 12a and 12b, respectively, being therefore always given rotational force from the belt 1. Thus, as the belt 1 begins to laterally shift, the area of contact between the rib 12a and the rib contacting portion 16e of the roller 16a becomes different in the amount of contact pressure from the area of contact between the rib 12b and the rib contacting portion 16e of the roller 16b.

Thus, the roller 16 (16a or 16b) which is on the opposite side of the belt 1 from the side to which the belt 1 is shifting overwhelms, in terms of the amount of rotational force it receives from the belt 1, the roller 16 (16b or 16a) on the side of the belt 1 from which the belt 1 is shifting away. However, the roller 16 (16a or 16b) which overwhelmed the other roller 16 (16b or 16a) in terms of the amount of the rotational force is prevented by the stopper portion 17 (17a or 17b) from rotating, because its cam portion 16f comes into contact with the stopper portion 17 (17a or 17b). Thus, the flange 15 (15a or 15b) which is on the opposite side of the belt 1 from the side to which the belt 1 is shifting is moved upward in FIG. 15, causing thereby the sleeve 13 to rotationally move about the bearing 14, being tilted in such a manner that the lengthwise end of the sleeve 13, which is on the opposite side of the belt 1 from the side to which the belt is shifting, is positioned higher than the other lengthwise end of the sleeve 13, as in the first embodiment.

More concretely, for example, if the belt 1 shifts in the direction indicated by the arrow mark M in FIG. 10, the amount of rotational force which the roller 16a in FIG. 15 is given by the belt 1 through the rib 12a becomes greater than the amount of rotational force which the roller 16b in FIG. 15 is given by the belt 1 through the rib 12b. Therefore, the roller 16a overwhelms the roller 16b in terms of rotational force, tending to tilt the sleeve 13 in the direction indicated by the arrow mark G in FIG. 10. Consequently, the belt 1 stops shifting in the direction indicated by the arrow mark M in FIG. 10, and begins to shift in the direction indicated by the arrow mark N in FIG. 10. In other words, the same effects as those obtainable by the belt driving portion 200 in the first embodiment can also be obtained by the belt driving portion 200 in this embodiment. In addition, the belt driving portion 200 in this embodiment is shorter in the length of time it takes for the belt 1 to be properly positioned (centered) after it begins to laterally shift.

By the way, in a case where the ribs 12a and 12b are made of an elastic material, if the belt 1 shifts in the direction indicated by the arrow mark M, for example, in FIG. 10, and therefore, the rib 12a comes into contact with the rib contacting portion 16e of the roller 16a, the rib 12a is elastically deformed by the contact pressure between itself and the rib contacting portion 16e. Thus, the belt 1 is made to shift in the direction indicated by the arrow mark N in FIG. 10, by the resiliency of the rib 12a, the amount of which corresponds to the amount of the deformation of the rib 12a.

Thus, in a case where the ribs 12a and 12b are made of an elastic material, the belt driving portion 200 may be structured so that the as the belt 1 shifts in the direction indicated by the arrow mark M in FIG. 10, the rib 12b separates from the rib contacting portion 16e of the roller 16b. As the rib 12b separates from the rib contacting portion 16e of the roller 16b, the roller 16b becomes free from the rotational force from the belt 1, making it unnecessary for the roller 16a to overwhelm the roller 16b in terms of the amount of rotational force when it makes the sleeve 13 tilt in the direction indicated by the arrow mark G in FIG. 10. Otherwise, the belt driving portion 200 in this embodiment is the same in structure and effects as the one in the first embodiment.

Embodiment 4

Next, referring to FIGS. 16 and 17, the fourth embodiment of the present invention is described with reference to another belt driving unit in accordance with the present invention, and an image forming apparatus equipped with the belt driving unit. The components, portions, etc., of the belt driving unit in this embodiment, and those of the image forming apparatus equipped with the belt driving unit, which are the same in structure as the counterparts in the preceding embodiments are given the same referential codes as those given to the counterparts, and are not going to be described here. In each of the preceding embodiments of the present invention, the belt driving portion 200 was structured so that the ribs 12a and 12b are attached to the inward surface of the belt 11, and on the inward side of the belt edges, one for one, in terms of the widthwise direction of the belt 1, and also, so that the rib contacting portion 16e of the roller 16a, and the rib contacting portion 16e of the roller 16b, are positioned on the inward side of the ribs 12a and 12b, respectively, in terms of the widthwise direction of the belt 1.

Further, in each of the preceding embodiments, the belt driving unit was structured so that the rib contacting portion 16e of the roller 16a and the rib contacting portion 16e of the roller 16b are positioned on the inward side of the rib 12a and 12b, respectively, and also, so that as the belt 1 laterally shifts, the opposite rib 12 (12a or 12b) from the direction in which the belt 1 is shifting comes into contact with the corresponding rib contacting portion 16e, and caused the roller 16 (16a or 16b) to push upward the end of the sleeve 13, which is on the side on which the rib 12 came into contact with the corresponding rib contacting portion 16e.

Figure 16:
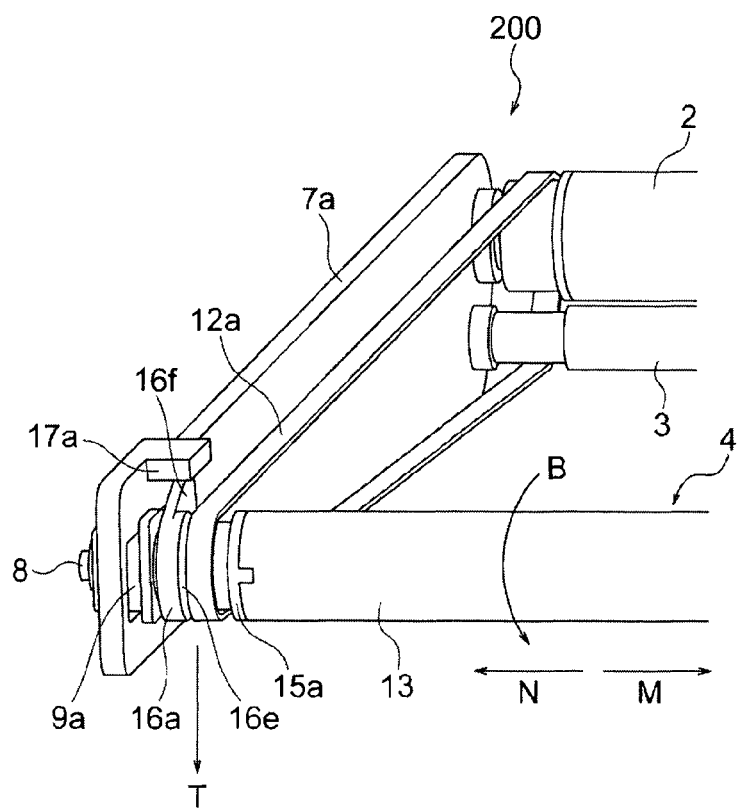
FIG. 16 is an enlarged perspective view of one of the lengthwise end portions of the belt suspending second member in the fourth embodiment, and shows the structure of the member.

Referring to FIG. 16, in this embodiment, the belt driving unit is structured so that the rib contacting portion 16b of the roller 16a, and the rib contacting portion 16e of the roller 16b, are on the outward side of the ribs 12a and 12b in terms of the widthwise direction of the belt 1. Thus, as the belt 1 laterally shifts, the rib 12 (12a or 12b) which is on the side toward with the belt 1 is shifting comes into contact with the rib contacting portion 16e of the roller 16 (16a or 16b), and causes the roller 16 (16a or 16b) to tilt the sleeve 13 so that the end of the sleeve 13, which is on the side where the rib 12 (12a or 12b) came into contact with the rib contacting portion 16e, is positioned higher than the opposite end of the sleeve 13.

FIG. 16 is a perspective view of one end of the belt driving unit in this embodiment, in terms of the widthwise direction of the belt 1. However, FIG. 16 does not show the belt 1. Referring to FIG. 16, the belt driving unit is structured so that the rib contacting portion 16e of the roller 16 is on the outward side of the rib 12 in terms of the widthwise direction of the belt 1, and also, so that the stopper portion 17a, with which the cam portion 16f of the roller 16a comes into contact, is positioned 180 degrees away from the position in which the stopper portion 17a was positioned in the first embodiment.

Thus, as the belt 1, which is being circularly moved in the direction indicated by an arrow mark B in FIG. 16, shifts in the direction indicated by an arrow mark N in FIG. 16, for example, the outward side of the rib 12a comes into contact with the rib contacting portion 16e of the roller 16a, transmitting to the roller 16a the rotational force from the belt 1.

Figure 17:
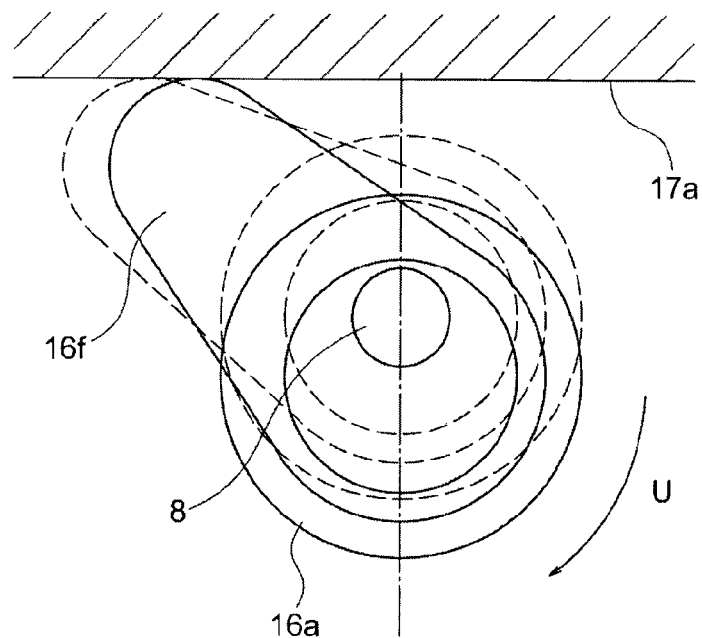
FIG. 17 is a plan view of one of the lengthwise end portions of the belt supporting second member in the first embodiment, as seen from the lengthwise direction of the member, and is for describing the movement of the belt position adjustment automatic mechanism in the fourth embodiment.

As the roller 16a receives the rotational force from the belt 1 through the rib 12a, the rotational force tends to rotate the roller 16a in the direction indicated by an arrow mark U in FIG. 17. However, the contact between the cam portion 16f of the roller 16a and the stopper 17a prevents the roller 16a from rotating. Consequently, the roller 16a is pushed down by the rotational force from the belt 1, from the position indicated by the broken line in FIG. 17 to the position indicated by the solid line in FIG. 17; it is pushed down in the opposite direction from the direction in which the roller 16a is moved in the first embodiment in terms of the vertical direction. Thus, the sleeve 13 is tilted in such a direction (indicated by arrow mark T) that the lengthwise end of the sleeve 13, which is on the side where the rib 12a came in contact with the rib contacting portion 16e of the roller 16a, is positioned lower than the opposite lengthwise end of the sleeve 13. Thus, the tension roller 4 (sleeve 13) stops tending to shift the belt 1 in the direction indicated by the arrow mark N in FIG. 16, and begins to causes the belt 1 to shift in the direction indicated by the arrow mark M in FIG. 16. In other words, this embodiment also can provided the same effects as those which can be provided by the first embodiment.

More concretely, in this embodiment, as the belt 1 shifts in the direction of the rib 12a (first rib), that is, the rib attached to the belt 1, next to one of the edges of the belt 1, the roller 16a (first rotational member) receives rotational force from the belt 1, and is rotated by this rotational force. On the other hand, as the belt 1 shifts in the direction of the rib 12b (second rib), that is, the rib 12 attached to the belt 1, next to the other edge of the belt 1, the roller 16b (second rotational member) receives rotational force from the belt 1, and is rotated by this rotational force. Otherwise, the belt driving unit in this embodiment is the same in structure as the one in each of the preceding embodiments. The effects of the embodiment are the same as those in each of the preceding embodiments.

Embodiment 5

Figure 18:
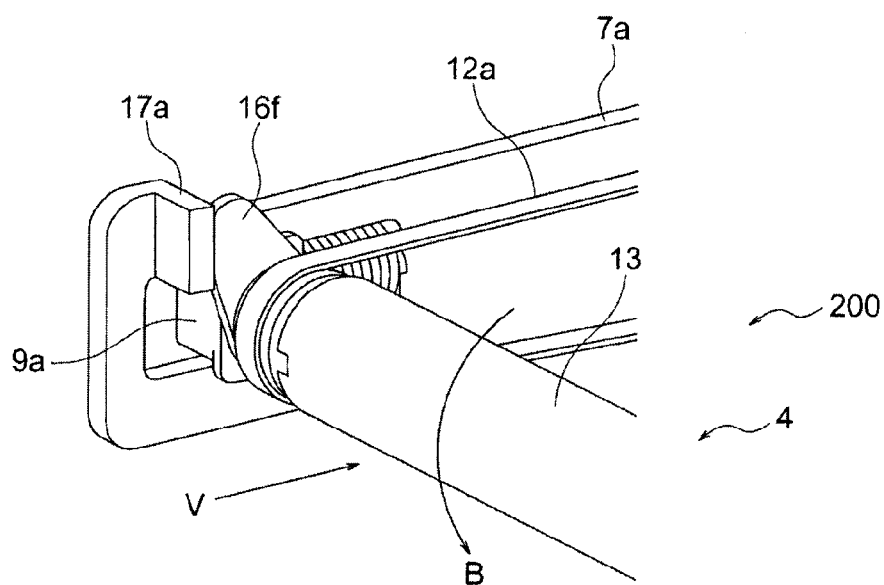
FIG. 18 is an enlarged perspective view of one of the lengthwise end portions, and its adjacencies, of the belt suspending second member in the fifth embodiment, and shows the structure of the member.

Next, referring to FIGS. 18 and 19, the present invention is described with reference to the fifth embodiment of the present invention, which is in the form of a belt driving unit, and an image forming apparatus equipped with the belt driving unit. The components, portions, etc., in this embodiment, which are similar in structure to the counterparts in each of the preceding embodiments are given the same referential codes as those given to the counterparts, and are not going to be described here. In each of the preceding embodiments, the belt driving unit was structured so that the sleeve 13 of the tension roller 4 is vertically and perpendicularly tilted relative to the direction in which the belt 1 is driven. In this embodiment, the sleeve 13 of the tension roller 4 was horizontally and perpendicularly tilted relative to the direction in which the belt 1 is driven.

In each of the preceding embodiments of the present invention, the belt driving unit was structured so that the direction (indicated by arrow mark B in FIG. 19) in which the sleeve 13 of the tension roller 4 tilted is roughly vertical to the axle 8 of the tension roller 14. However, the direction in which the rollers 16a or 16b are pushed by the force given to the roller 16a and 16b by the belt 1 through the ribs 12a and 12b as the rollers 16a and 10b are prevented by the stopper portions 17a and 17b from rotating does not need to be the direction in which the roller 16a or 16b is pushed in the preceding embodiments. That is, the unwanted lateral shift of the belt 1 can also be controlled by tilting the sleeve 13 of the tension roller 4 in the direction (indicated by arrow mark V in FIG. 18) which is horizontal and roughly perpendicular to the direction (indicated by arrow mark B in FIG. 19) of the tension given to the belt 1 by the tension roller.

Figure 19:
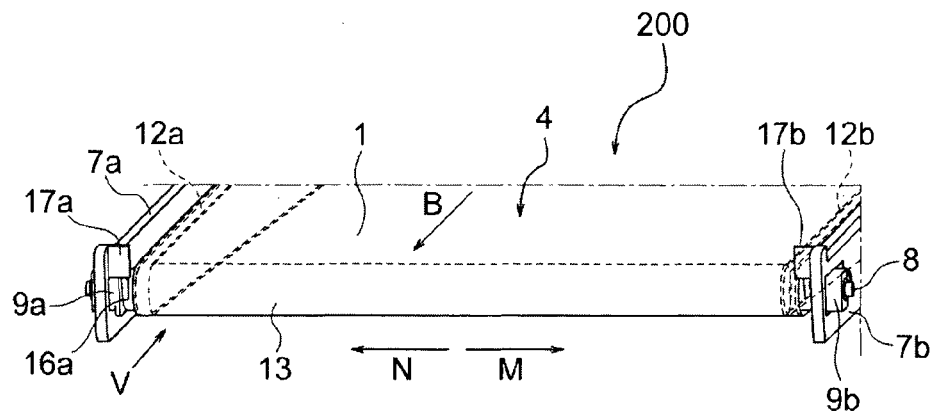
FIG. 19 is a perspective view of the belt suspending second member of the belt driving unit, and its adjacencies, in the fifth embodiment of the present invention, and shows the structure of the belt driving unit.

FIG. 19 is a perspective view of one of the lengthwise end portions of the tension roller 4 of the belt driving unit in this embodiment. It does not show the belt 1. Referring to FIG. 18, in this embodiment, the stopper 17a with which the cam portion 16f of the roller 16a comes into contact is positioned roughly 90 degrees away from the position of the stopper 17a in the first embodiment.

As the belt 1 shifts rightward in FIG. 19, that is, the direction indicated by an arrow mark M in FIG. 19, while it is being circularly moved in the direction indicated by an arrow mark B in FIG. 19, the rib 12a comes into contact with the rib contacting portion 16e of the roller 16a. Thus, the roller 16a is given rotational force from the belt 1 through the rib 12a, being thereby rotated by the rotational force. As the roller 16a is rotated, its cam portion 16e comes into contact with the stopper portion 17a, preventing thereby the roller 16a from rotating further. Consequently the roller 16a is pushed in the direction indicated by an arrow mark V in FIG. 18, causing the sleeve 13 to tilt in such a direction that the lengthwise end of the sleeve 13, which is in contact with the roller 16a, is pushed in the direction indicated by the arrow mark V in FIG. 18. Thus, the sleeve 13 is tilted in the direction (indicated by arrow mark V in FIG. 18) which is parallel to the direction of the tension given to the belt 13 by the tension roller 4.

Therefore, as the belt 1 shifts, for example, in the direction indicated by the arrow mark M in FIG. 19, the rib 12a comes into contact with the rib contacting portion 16e of the roller 16a, transmitting to the roller 16a the rotational force from the belt 1. Consequently, the sleeve 13 is tilted in such a direction that the lengthwise end of the sleeve 13 moves in the direction indicated by the arrow mark V in FIG. 19. Therefore, the belt 1 gradually reduces in the speed with which it is shifting in the direction indicated by the arrow mark M in FIG. 19, stops shifting, and begins to shift in the opposite direction, that is, the direction indicated by the arrow mark N in FIG. 19. In other words, the same effects as those obtainable by the first embodiment can also obtained by this embodiment. Otherwise, the belt driving unit in this embodiment is the same in structure and effects as that in the first embodiment.

Embodiment 6

Next, referring to FIG. 20, the present invention is described with reference to the belt driving unit in the sixth embodiment of the present invention, and an image forming apparatus equipped with the belt driving unit. The components, portions, etc., of the belt driving unit in this embodiment, which are similar in structure to the counterparts in each of the preceding embodiments are given the same referential codes as those given to the counterparts, one for one, and are not going to be described here. In each of the preceding embodiments, the belt driving unit was structured so that the sleeve 13 of the tension roller 4 is rotationally movable about the bearing 14 to tilt the sleeve 13 relative to the axle 8. In comparison, in this embodiment, the belt driving unit is provided with a sub-frame 23 for supporting the tension roller 24 which supports, and keeps tensioned, the belt 1. Further, the sub-frame 23 is fitted around a pivot 22 with which the frame 120a of the intermediary transfer unit 120 is provided. Further, the sub-frame 23 is rotatable in an oscillatory manner about a pivot 22 which is at the center of the sub-frame 23 in terms of the lengthwise direction of the sub-frame 23 of the frame 120a of the intermediary transfer unit 120, in the direction indicated by an arrow mark W in FIG. 20.

In the first embodiment, the belt driving unit was structured so that the bearing 14 was fitted in the hollow of the cylindrical sleeve 13, at the lengthwise center of the sleeve 13, and also, so that the sleeve 13 is allowed to pivot in an oscillatory manner about the bearing 14 to be tilted relative to the axle 8. In comparison, in this embodiment, the belt driving unit is provided with a tension roller supporting sub-frame 23, which is separate from the main frame of the belt driving unit. Further, the tension roller supporting sub-frame 23 is fitted around the pivot 22 of the frame 120a so that it is allowed to rotate about the pivot 22 in an oscillatory manner. This structural arrangement also can allow the sleeve 13 of the tension roller 4 to tilt like the sleeve 13 of the tension roller 4 in the first embodiment.

Figure 20:
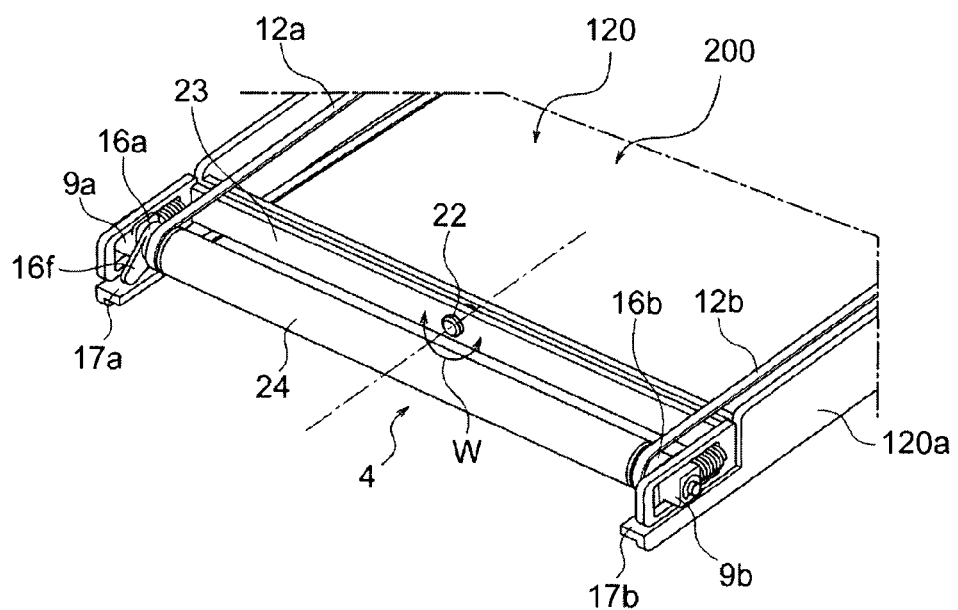
FIG. 20 is a perspective view of the belt suspending second member of the belt driving unit, and its adjacencies, in the sixth embodiment of the present invention, and shows the structure of the belt driving unit.

FIG. 20 is a perspective view of the tension roller 4 and its adjacencies in this embodiment. It 20 does not show the belt 1. Referring to FIG. 20, the tension roller 24 is supported by its lengthwise end portions, in such manner that it can be rotated, as it was in the first embodiment. The tension roller supporting sub-frame 23 is supported by the frame 120a of the belt driving unit in such a manner that roughly the lengthwise center portion of the sub-frame 23 is fitted around the pivot 22 (with which the frame 120a is provided) to allow the sub-frame 23 to rotate about the pivot 22 in an oscillatory manner.

Therefore, the tension roller 24 is allowed to freely rotate about the pivot 22 to be tilted in the direction indicated by an arrow mark W in FIG. 20, relative to the main frame 120a of the belt driving unit. Like the lengthwise end portions of the tension roller 4 in the first embodiment, the lengthwise end portions of the tension roller 24 are provided with rollers 16a and 16b, one for one, which are rotationally movable relative to the tension roller 24. With the provision of the above described structural arrangement, the belt driving unit in this embodiment also can keep its belt 1 properly positioned in terms of the widthwise direction of the belt 1, as can the belt driving unit in the first embodiment. Otherwise, the belt driving unit in this embodiment is the same in structure and effects as the one in the first embodiment.

Embodiment 7

Figure 21:
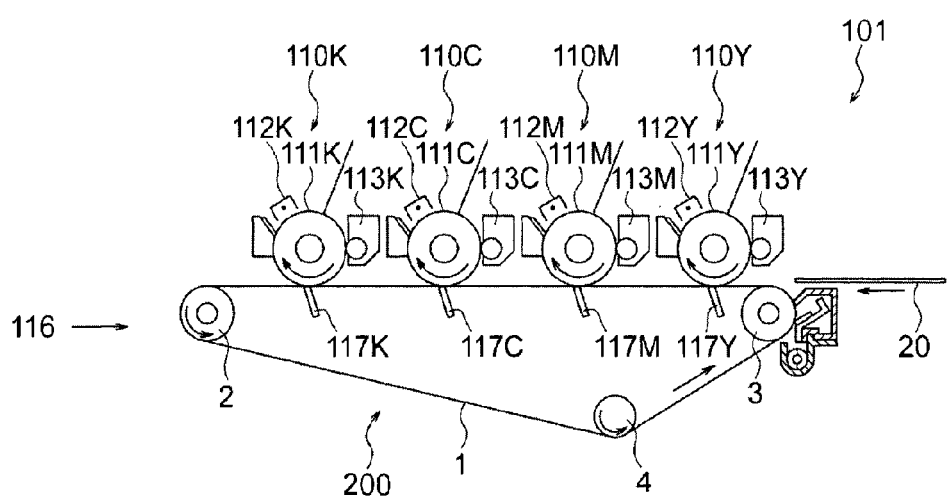
FIG. 21 is a schematic sectional view of a typical image forming apparatus equipped with a belt driving unit, as a recording medium conveyance unit, in accordance with the present invention, and describes the general structure of the apparatus.

Next, referring to FIG. 21, the present invention is described with reference to the seventh belt driving unit in accordance with the present invention, and an image forming apparatus equipped with the belt driving unit. The components, portions, etc., of the belt driving unit and image forming apparatus in this embodiment, which are similar in structure to the counterparts in each of the preceding embodiments are given the same referential codes as those given to the counterparts, one for one, and are not going to be described here. In each of the preceding embodiments, the belt driving unit in accordance with the present invention was a part of the intermediary transfer unit 120, and the image forming apparatus was provided with the intermediary transfer unit 120 having the intermediary transfer unit which employs the belt driving unit in accordance with the present invention. In this embodiment, the belt driving unit in accordance with the present invention is a part of a recording medium conveyance unit of the image forming apparatus.

In each of the preceding embodiments of the present invention, the belt 1 was an intermediary transfer belt as a means for conveying a sheet of recording medium. However, the present invention is also applicable to a belt 1 used to convey a sheet of recording medium for an image forming apparatus such as an image forming apparatus 101 structured and operated as follows, as has been known to people in this field of business: an electrostatic latent image(s) is formed on one (or more) photosensitive drum 111 as an image bearing member, and is developed into a toner image(s). Then, the toner image is directly transferred onto a sheet 20 of recording medium, which is being conveyed by a belt 1 which is circularly movable while facing the peripheral surface of the photosensitive drum(s). Then, the sheet 20 is separated from the belt 1, and the unfixed toner image on the sheet P is fixed to the sheet P to obtain a print. FIG. 21 is a schematic sectional view of a typical image forming apparatus equipped with a belt driving unit, as a recording medium conveyance unit, in accordance with the present invention, and shows the general structure of the apparatus. Referring to FIG. 21, the image forming apparatus 101 has multiple image forming means, more specifically, image formation units 110Y, 110M, 110C and 110K which form yellow, magenta, cyan, and black monochromatic toner image, respectively. Each image formation unit 110 forms an electrostatic latent image on its photosensitive drum 111 (image bearing member), and forms a toner image by developing the electrostatic latent image.

The description of the processes through which a toner image is formed on the photosensitive drum 111 in each image formation unit 110 are the same as those given in the description of the first embodiment. Thus, the components, portions, etc., of the image forming apparatus 101 in this embodiment, which are the same in function and structure are given the same referential codes as those given to the counterparts of the image forming apparatus 100 in the first embodiment, and are not going to be described here in detail.

The image forming apparatus 101 has: an unshown recording medium supply unit; a recording medium conveyance unit 116 having a belt 1 and a belt driving unit; and a transferring device 117 as a transferring means, which opposes the peripheral surface of each photosensitive drum 111, with the presence of the belt 1 between itself and photosensitive drum 111. The recording medium conveyance unit 116 is positioned so that its belt 1 faces the photosensitive drum 111. In an image forming operation, a sheet 20 of recording medium is sent out from the recording medium supply unit 116, in synchronism with the formation of a toner image on the photosensitive drum 111 in each image formation unit 110. Then, the sheet 20 is delivered to the belt 1 of the recording medium conveyance unit 116. Then, the toner images, different in color, formed on the photosensitive drums 111, one for one, are sequentially transferred by the function of the transferring device 117 onto the sheet 20 of recording medium which is being conveyed by the belt 1.

After the completion of the transfer process, the sheet 20 of recording medium is separated from the belt 1, and is conveyed to an unshown fixing device as a fixing means. Then, the unfixed toner images on the sheet 20 are fixed to the sheet P by the fixing device. Then, the sheet 20 is discharged as a finished print from the image forming apparatus 101.

In other words, the present invention is also applicable to a belt centering mechanism, as a means for controlling the lateral shift of a belt 1, for an image forming apparatus having a recording medium conveyance unit. That is, the same effects as those obtainable by each of the preceding embodiments are obtainable by providing the recording medium conveyance unit 116 of the image forming apparatus 101 shown in FIG. 20, with a tension roller such as the tension roller 4, the description of which was given as a part of the description of each of the preceding embodiments. Incidentally, the image forming apparatus 101 and recording medium conveyance unit 116 may be structured so that the latter is removably installable in the former, or the latter is a permanent component of the former. The components, portions, etc., of the image forming apparatus and its recording medium conveyance unit other than those of the recording medium conveyance unit, are the same in structure as the counterparts in each of the preceding embodiment. The effects of this embodiment are the same as those of each of the preceding embodiments.

While the invention has been described with reference to the structures disclosed herein, it is not confined to the details set forth, and this application is intended to cover such modifications or changes as may come within the purposes of the improvements or the scope of the following claims.

INDUSTRIAL APPLICABILITY

According to the present invention, there is provided a belt driving unit which is substantially smaller in the amount by which one of the belt suspension rollers is moved to keep the belt properly positioned in terms of the widthwise direction of the belt.

The invention claimed is:

1. A belt feeding unit comprising:
a rotatable belt;
a first stretching roller for stretching said belt;
a second stretching roller including a stretching portion for stretching said belt, said stretching portion being rotated by rotation of said belt and having a rotational shaft;
a first member provided at one end portion of said stretching portion with respect to a widthwise direction of said belt and perpendicular to a movement direction of said belt, said first member being movable relative to said stretching portion to change a position of one end of said stretching portion at the one end portion;
a second member provided at the other end portion of said stretching portion with respect to the widthwise direction of said belt, said second member being movable relative to said stretching portion to change a position of the other end of said stretching portion at the other end portion,
wherein when said belt shifts in the widthwise direction to contact said first member, said first member moves relative to said stretching portion to incline said stretching portion relative to said first stretching roller, and said second member does not prevent movement of said stretching portion by said first member.

2. A belt feeding unit according to claim 1, wherein said belt is provided with a first rib contacting said first member.

3. A belt feeding unit according to claim 2, wherein said belt is provided with a second rib contacting said second member.

4. A belt feeding unit according to claim 1, wherein said second stretching roller includes a reference shaft having opposite end portions supported by bearings, said reference shaft being parallel with a rotational axis of said first stretching roller.

5. A belt feeding unit according to claim 4, wherein said reference shaft has an outer diameter smaller than an inner diameter of said stretching portion.

6. A belt feeding unit according to claim 4, wherein said stretching portion includes a sleeve having an outer surface contactable with said belt.

7. A belt feeding unit according to claim 6, wherein said second stretching roller is provided with a supporting portion for supporting said stretching portion, and said reference shaft is provided inside said sleeve, and said supporting portion supports said sleeve by contacting an inner surface of said sleeve, wherein said sleeve it supported by said supporting portion only at a central portion with respect to the longitudinal direction.

8. A belt feeding unit according to claim 7, wherein said sleeve is supported by said supporting portion at one position which is substantially at a center of said reference shaft.

9. A belt feeding unit according to claim 3, wherein said belt is provided with said first rib at said one end and is provided with said second rib at the other longitudinal end, wherein said first member includes a first rotatable member disposed adjacent said first rib, and said second member includes a second rotatable member disposed adjacent said second rib, and wherein when said belt shifts toward said second rib, said second rotatable member receives a rotational force for said belt from said second rib, thus making rotation.

10. A belt feeding unit according to claim 1, wherein when said belt shifts in the widthwise direction to contact said first member, said first member moves relative to said stretching portion to incline said stretching portion relative to said first stretching roller, and said second member is placed at a position away from said belt.

11. A belt feeding unit according to claim 1, wherein when said belt shifts in the widthwise direction to contact said first member, said first member moves relative to said stretching portion to incline said stretching portion relative to said first stretching roller, and said second member does not receive a rotational force from said belt.

\* \* \* \* \*